US007591014B2

(12) United States Patent
England et al.

(10) Patent No.: US 7,591,014 B2
(45) Date of Patent: Sep. 15, 2009

(54) PROGRAM AUTHENTICATION ON ENVIRONMENT

(75) Inventors: Paul England, Bellevue, WA (US); Thekkthalackal Varugis Kurien, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 756 days.

(21) Appl. No.: 11/072,982

(22) Filed: Mar. 4, 2005

(65) Prior Publication Data

US 2006/0200859 A1 Sep. 7, 2006

(51) Int. Cl.
*G06F 7/04* (2006.01)
(52) U.S. Cl. ........................................................ 726/17
(58) Field of Classification Search ................ 726/1, 726/4, 16, 17, 34, 10; 713/1, 2, 100, 192, 713/194, 167, 176, 187, 165; 707/100; 709/223; 235/379; 463/29; 717/100
See application file for complete search history.

(56) References Cited

U.S. PATENT DOCUMENTS

| | | | | |
|---|---|---|---|---|
| 6,367,012 | B1 * | 4/2002 | Atkinson et al. | 713/176 |
| 7,213,266 | B1 * | 5/2007 | Maher et al. | 726/26 |
| 7,309,004 | B1 * | 12/2007 | Muschellack et al. | 235/379 |
| 7,313,679 | B2 * | 12/2007 | Ranganathan | 713/1 |
| 7,467,370 | B2 * | 12/2008 | Proudler et al. | 717/100 |
| 2004/0064457 | A1 * | 4/2004 | Zimmer et al. | 707/100 |
| 2005/0132031 | A1 * | 6/2005 | Sailer et al. | 709/223 |
| 2006/0026423 | A1 * | 2/2006 | Bangerter et al. | 713/164 |
| 2006/0100010 | A1 * | 5/2006 | Gatto et al. | 463/29 |

OTHER PUBLICATIONS

Jonathan Poritz, Mattias Schunter, Els Van Herreweghen, and Michael Waidner. "Property Attestation: Scalable and Privacy-friendly Security Assesment of Peer Computers'". Early dissemination research report (May 2004). IBM Research GmbH.*

T. Garfinkel, B. Pfaff, J. Chow, M. Rosenblum, and D. Boneh, "Terra: A Virtual machine-Based Platform for Trusted Computing," in Proc. 9th ACM Symposium on Operating Systems Principles, 2003, pp. 193-206.*

H. Maruyama, F. Seliger, N. Nagaratnam, T. Ebringer, S. Munetho, and S. Yoshihama, "Trusted Platform on demand (TPod)," in Technical Report, Submitted for Publication, 2004.*

(Continued)

*Primary Examiner*—Ellen Tran
*Assistant Examiner*—Hee Song
(74) *Attorney, Agent, or Firm*—Woodcock Washburn LLP

(57) ABSTRACT

To authenticate a program on a computing device to a resource local to or remote from the computing device, a stored program security identifier (PSID) corresponding to the program is retrieved, where the stored PSID includes information taking into account the program itself, the execution setting of the program, and any inputs and initializations that are provided to the program. The PSID is re-constructed based on the same information as obtained from local sources, and the stored and reconstructed PSIDs are compared to determine whether a match exists. If so, it may be concluded that the program operates in a trusted manner according to an approved set of conditions.

20 Claims, 4 Drawing Sheets

OTHER PUBLICATIONS

Reiner Sailer, Trent Jaeger, Xiaolan Zhang, and Leendert Van Doorn, "Attestation-based Policy Enforcement for Remote Access", In CCS'04: Proceedings of the 11th ACM conference on Computer and Communications Security, 2004.*

Hiroshi Maruyama, Taiga Nakamura, Seiji Munetoh, Yoshiaki Funaki, and Yuhji Yamashita, "Linux with TCPA Integrity Measurement", Research Report. IBM Research, Tokyo Research Laboratory. (Jan. 2003).*

Reiner Sailer, Xiaolan Zhang, Trent Jaeger, and Leendert van Doorn, "Design and Implementation of a TCG-Based Integrity Measurement Architecture." In Proceedings of the 11th USENIX Security Symposium. USENIX, Aug. 2004.*

Jonathan Poritz, Mattas Schunter, Els Van Herreweghen and Michael Waidner. "Property Attestation: Scalable and Privacy-friendly Security Assesment for Peer Computers." Early dissemination research report (May 2004). IBM Research GmbH.*

T. Garfinkel, B. Pfaff, J. Chow, M. Rosenblum, and D. Boneh, "Terra: A Virtual Machine-Based Platform for Trusted Computing," in Proc. 9th ACM Symposium on Operating Systems Principles, 2003, pp. 193-206.*

H. Maruyama, F. Seliger, N. Nagartnam, T. Ebringer, S. Muentho, and S. Yoshihama, "Trusted Platform on demand (TPod)," in Technical Report, Submitted for Publication, 2004.*

Reiner Sailer, Trent Jaeger, Xiaolan Zhang, and Leendert Van Doorn, "Attestation-based Policy Enforcement for Remote Access," In CCS'04: Proceedings of the 11th ACM conference on Computer and Communications Security, 2004.*

Hiroshi Maruyama, Taiga Nakamura, Seiji Munetoh, Yoshiaki Funaki, and Yuhji Yamashita, "Linux with TCPA Integrity Measurement," Research Report. IBM Research, Tokyo Research Laboratory. (Jan. 2003).*

Reiner Sailer, Xiaolan Zhang, Trent Jaeger, and Leendert van Doorn, "Design and Implementation of a TCG-Based Integrity Measurement Architecture." In Proceedings of hte 11th USENIX Security Symposium. USENIX, Aug. 2004.*

William A. Arbaugh. David J. Farber, and Jonathan M. Smith, "A reliable bootstrap architecture." In Proceedings of the IEEE Symposium on Research in Security and Privacy, pp. 65-71, Oakland, CA, May 1997. IEEE Computer Society, Technical Committee on Security and Privacy, IEEE Computer Society Press.*

Arvind Seshadri Perrig, Adrian Perrig, Leendert van Doorn, and Pradeem Khosla, "SWAT: SoftWare-based ATTestation for Embedded Devices," In Proceedings of the IEEE Symposium on Research in Security and Privacy, pp. 272-282, May 2004.*

* cited by examiner

PROGRAM AUTHENTICATION ON ENVIRONMENT

TECHNICAL FIELD

The present invention relates to an architecture and method for allowing a program to be authenticated based not only on the program itself but based on the environment within which the program resides. More particularly, the present invention relates to such an architecture and method whereby the authentication of the program includes an authentication of each layer of software between the program and an underlying piece of hardware such as a computing device.

BACKGROUND OF THE INVENTION

A software program or application or the like (hereinafter, 'program') as developed for a computing device or the like may at times be required to be authenticated to another entity, either local to or remote from the computing device. For one example, a banking program interacting with a remote banking server may be required to be authenticated to the banking server as in fact being the banking program, and not some other program masquerading as the banking program for malicious or nefarious purposes. For another example, an audio rendering program interacting with a rights management program on the computing device may be required to be authenticated to the rights management program as in fact being the audio rendering program, and not some other program masquerading as the audio program for malicious or nefarious purposes.

As may be appreciated, program authentication is important in many other settings. For example: a local user needs assurance that he or she is typing a password into a legitimate program and not a program designed to steal the password; a platform running a program may demand an authentication token such as for example a certificate for the program before executing same; an organization may demand that each employee or other individual thereof use a computing device with an operating system with a particular approved configuration; such operating system may be configured to only load and execute drivers or programs that comply with a particular administrator policy; and the like.

As may be appreciated, many techniques exist for program authentication, and authentication data may be used for many different access control purposes. However, and significantly, authenticating a program itself is not always sufficient for purposes of determining whether to impart trust to the program. In particular, authenticating a program for purposes of imparting trust thereto should also include authenticating the setting within which the program resides, and should further include authenticating the underlying platform upon which the program operates. For example, the security status of an operating system running directly on hardware of a computing device is different than of such operating system running on a virtual machine which in turn runs directly on such hardware.

In particular, the security status of the operating system running on a virtual machine should take into consideration the fact that other operating systems running on the virtual machine may be able to examine and modify the operating system at issue and the flow of execution thereof. In such a situation, a determination of whether to impart trust to the operating system as issue should include a determination of whether to impart trust to the virtual machine. More generally, then, a determination of whether to impart trust to a program should include a determination of whether to impart trust to the execution environment of the program, since the execution environment will affect the running state of the program. As may be appreciate, the execution environment may be hardware, or may be established by another program, or both.

A need exists, then, for a method and mechanism by which a computer program can be authenticated both in terms of the program itself and the environment within which such program resides. More particularly, a need exists for such a method and mechanism whereby the authentication of the program itself includes a consideration of the setting and circumstances within which the program itself runs and the inputs that are provided to the program. Further, a need exists for such a method and mechanism whereby the authentication of the program includes an authentication of the underlying platform upon which the program operates.

SUMMARY OF THE INVENTION

The aforementioned needs are satisfied at least in part by the present invention in which a method is provided in combination with a program operating on a computer device, where the method authenticates the program to a resource local to or remote from the computing device. In the method, a stored program security identifier (PSID) corresponding to the program is retrieved, where the stored PSID includes information taking into account the program itself, the execution setting of the program, and any inputs and initializations that are provided to the program. Thus, the PSID represents an approved set of conditions for operating the program in a trusted manner.

The PSID is re-constructed based on the same information as obtained from local sources, and the stored and reconstructed PSIDs are compared to determine whether a match exists. If it is determined that a match exists, it may be concluded that the program operates in the trusted manner according to the approved set of conditions. Likewise, if it is determined that a match does not exist, it may be concluded that the program does not operate in the trusted manner according to the approved set of conditions.

In addition, a method is provided to authenticate the program where the program to be authenticated is being hosted by a number of layers of hosting programs that ultimately rest upon hardware representative of the computing device. In such method, for each of the program to be authenticated and the hosting program at each of at least some layers, the PSID corresponding to the program is established, and all of the established PSIDs are combined to produce a composite PSID (CPSID) representing an overall security environment of the program to be authenticated. The produced CPSID is delivered to the resource, whereby such resource reviews such delivered CPSID and determines based at least partially on such review whether to trust the program to be authenticated.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
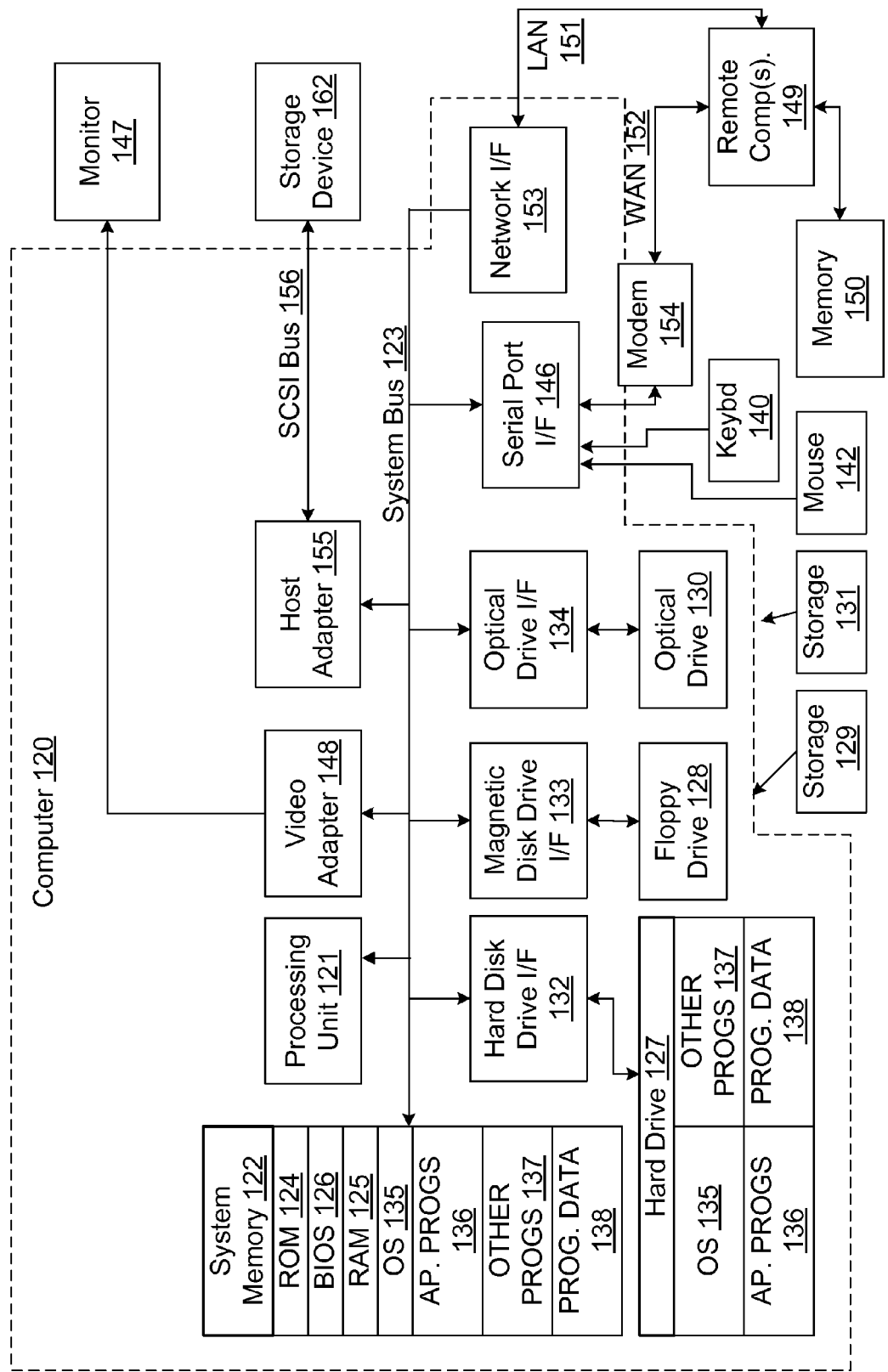
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Program Authentication Based on Environment

The present invention relates to authenticating a program on a computing device based at least in part on the environment of the program. As was alluded to above, such authentication includes a consideration of the type of setting, such as for example the operating system running on the computing device and the inputs to the program, and may also include an authentication of the underlying platform upon which the program operates, such as for example by authenticating each underlying layer of software between the program and the hardware of the computing device.

Notably, the authentication may be provided to another entity either local to or remote from the computing device. Thus, the authentication may for example be given to a remote server from which the program has requested data, or to a local program from which the program at issue has requested a resource. While the program at issue may itself provide the authentication without departing from the spirit and scope of the present invention, it is more likely that the authentication is provided by another program or by the hardware of the computing device, either of which has already established a level of trust with the target of the authentication.

Figure 2:
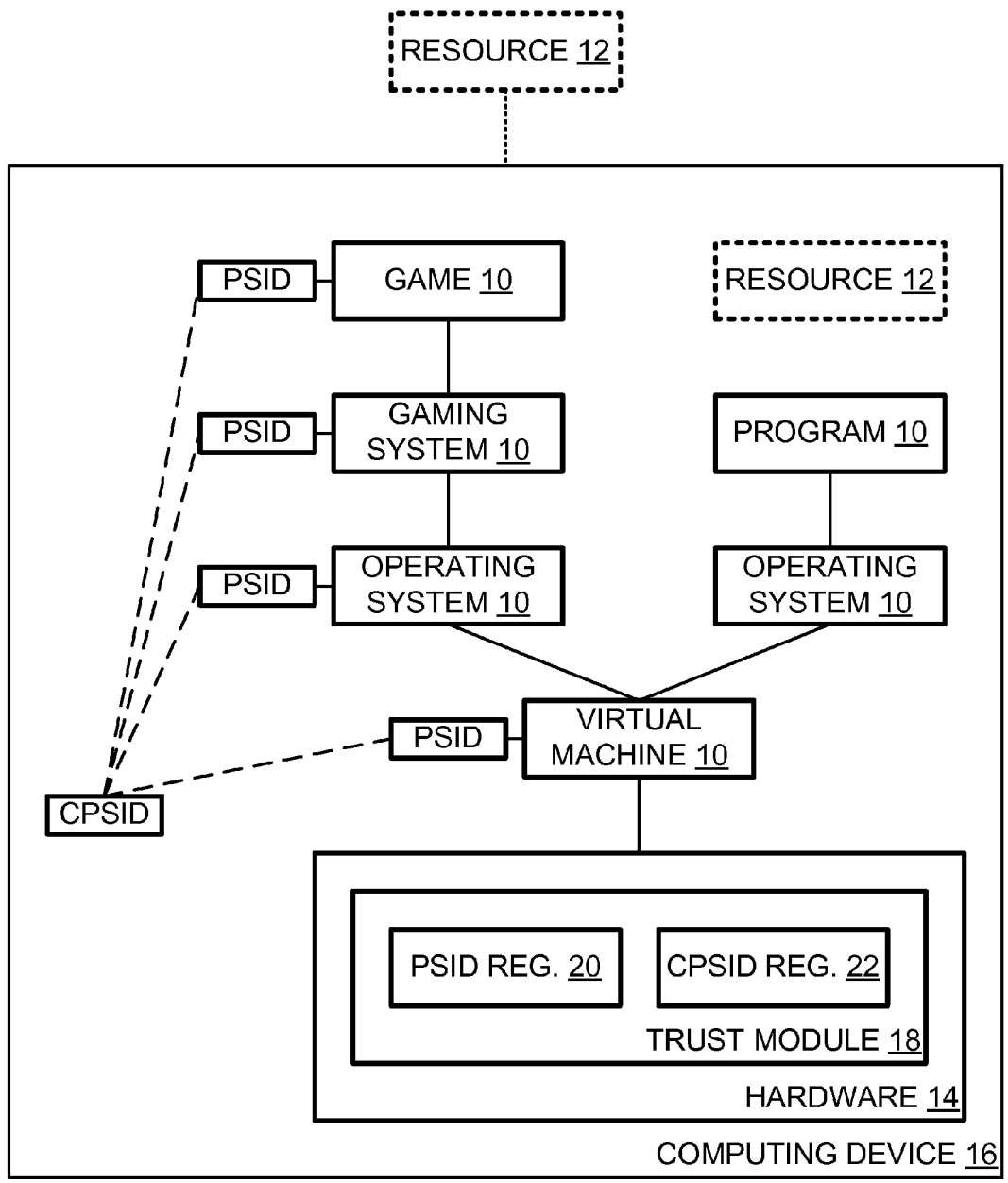
FIG. 2 is a block diagram showing the architecture within which the present invention operates, and specifically a program operating on a computing device and hosted by a number of layered programs that form an underlying platform resting upon hardware of the computing device.

As may be appreciated, it is oftentimes the case that a program 10 that is to be authenticated to a target or resource 12 (hereinafter, 'resource 12') is in fact a program 10 hosted by one or more layers of other programs 10 that ultimately rest upon hardware 14 representative of a particular computing device 16, as is seen in FIG. 2. For example, and as shown, the hardware 14 of the computing device 16 may initially instantiate a virtual machine as a program 10 at a first or bottom-most layer, and the virtual machine 10 may be considered a platform that supports two instantiated operating systems and a service system as programs 10 at a second, higher layer. Similarly, one of the operating systems 10 may be considered a platform that supports a gaming system and a network browsing system as program 10 at a third, higher layer, and the gaming system 10 may be considered a platform that supports a particular game as a program 10 at a fourth, top-most layer.

With respect to the game 10, then, it is to be appreciated that a resource 12 in imparting trust to the game 10 should consider not only on the game 10 itself, but also the gaming system 10 supporting the game 10, the operating system 10 supporting the gaming system 10, the virtual machine 10 supporting the operating system 10, and the hardware 14 supporting the virtual machine 10. For example, such a resource 12 may wish to determine that the operating system 10 supporting the gaming system 10 can be trusted to prevent other supported programs 10 from accessing any resource as provided by the resource 12 to the game 10. Likewise, such a resource 12 may wish to determine that the gaming system 10 supporting the game 10 can be trusted to be operated only with a prescribed set of inputs.

Typically, although not necessarily, the hardware 14 is particularly trustworthy and includes a trusted platform or the like that can authenticate each program 10 by way of an authenticated boot protocol or the like. Such trusted hardware 14 is known or should be apparent to the relevant public and therefore need not be set forth in detail. Accordingly, any type of such trusted hardware 14 may be employed without departing from the spirit and scope of the present invention.

Thus, the resource 12 determines whether to trust a particular program 10 that is being authenticated thereto based at least in part on a determination that the hardware 14 is trustworthy. Note, though, that in the case where the hardware 14 is not especially trustworthy, the resource 12 may alternately establish trust in a particular program 10 on the computing device without departing from the spirit and scope of the present invention. For example, the program 10 may again be hosted by one or more layers of other programs 10 that ultimately rest upon hardware 14 representative of a particular computing device 16, as is seen in FIG. 2, but a program 10 at a lower layer may be particularly trustworthy and include the aforementioned trusted platform or the like that can authenticate each program 10 by way of an authenticated boot protocol or the like.

Generally, if an element such as the hardware 14 or a particular program 10 is trusted by a resource 12, the resource trusts such element to provide an authentication for each program 10 supported by such element. Thus, and referring to FIG. 2, the hardware 14 upon being trusted can provide an authentication for the virtual machine 10, the virtual machine 10 upon being trusted based on the authentication from the hardware 14 can provide an authentication for the operating system 10, the operating system 10 upon being trusted based on the authentication from the virtual machine 10 can provide an authentication for the gaming system 10, and the gaming system 10 upon being trusted based on the authentication from the operating system 10 can provide an authentication for the game 10. Note that to provide an authentication, each particular element should have a policy engine or the like that can gather information necessary for such an authentication, construct the authentication, and deliver same. Note, too, that the authentication may be delivered directly to the resource 12 or may be delivered to the program 10 or the hardware 14 at the next lower layer, as the case may be.

In one embodiment of the present invention, the authentication of any particular program 10 takes into account: the program 10 itself; the execution setting of the program 10; and any inputs and initializations (hereinafter, 'inputs') that are provided to the program 10. Especially inasmuch as the layered system of FIG. 2 involves a program 10 or the hardware 14 at a lower layer instantiating the program 10 at issue at the next-higher layer and controlling the setting thereof, the instantiating entity 10/14 at the lower layer is particularly suited to have knowledge of such items and thus is particularly suited to authenticate the instantiated program 10 by way of the policy engine of such instantiating entity 10/14. Moreover, such instantiating entity 10/14 and the policy engine thereof can also re-authenticate such instantiated program 10 on a regular basis or upon request, as the case may be.

In taking into account a program 10 itself during authentication thereof, the instantiating entity may for example refer to a digital certificate corresponding to the program 10 and may validate a digital signature thereof and also satisfy itself that the certificate descends from an acceptable root of trust. In addition or in the alternative, if the program 10 is accompanied by a manifold or other listing, the manifold should be checked to determine that related files and data are present, any hash of the program 10 verifies, etc. Also, the program 10 itself can be identified, either by file name, meta-data in a file of the program 10, a name parameter, or the like.

In taking into account the setting of a program 10 during authentication thereof, the instantiating entity may for example refer to the aforementioned certificate and/or manifold or the like to determine an approved setting for the program, and in fact confirm that the approved setting is indeed present. Typically, although not necessarily, the approved setting may include an identification of other programs 10 at the layers between the program 10 at issue and the hardware 14, and perhaps other information such as other programs 10 that should be operating on the computing device 16 and/or other programs 10 that should not be operating on the computing device 16, etc. In addition, the setting may include a particular run mode established for the program 10, any special privileges or restrictions established for the program 10, and the like.

In taking into account the inputs to a program 10 during authentication thereof, the instantiating entity may for example again refer to the aforementioned certificate and/or manifold or the like to determine an approved set of inputs for the program, and in fact confirm that the approved set of inputs is indeed employed to instantiate the program 10. Typically, although not necessarily, the approved set of inputs include whatever might be fed to the program 10 instantiation, such as for example a command string, a run script, a library or executable loaded during instantiation, a registry key employed by the program 10 during instantiation, a user interface presented by the program 10 during instantiation, and the like.

In one embodiment of the present invention, information relating to the aforementioned program 10 itself, the execution setting of the program 10, and the inputs that are provided to the program 10 are parameterized into a program security identifier (PSID) by a publisher of the program 10 or the like, where the PSID is made available to the instantiating program 10 instantiating such program 10. Thus, the PSID represents an approved set of conditions for operating the program 10 in a trusted manner, as set forth by the publisher or the like. Such PSID for the program 10 as provided by the publisher or the like may be stored with such program 10 or may be stored in another location available to the instantiating program 10 without departing from the spirit and scope of the present invention.

The actual form of the stored PSID may indeed be any appropriate form without departing from the spirit and scope of the present invention as long as such stored PSID indeed memorializes the aforementioned information relating to the program 10 itself, the execution setting of the program 10, and the inputs that are provided to the program 10. For example, such information may be set forth within the stored PSID as a list, or such information may be concatenated and hashed in an appropriate manner to form the PSID.

Figure 3:
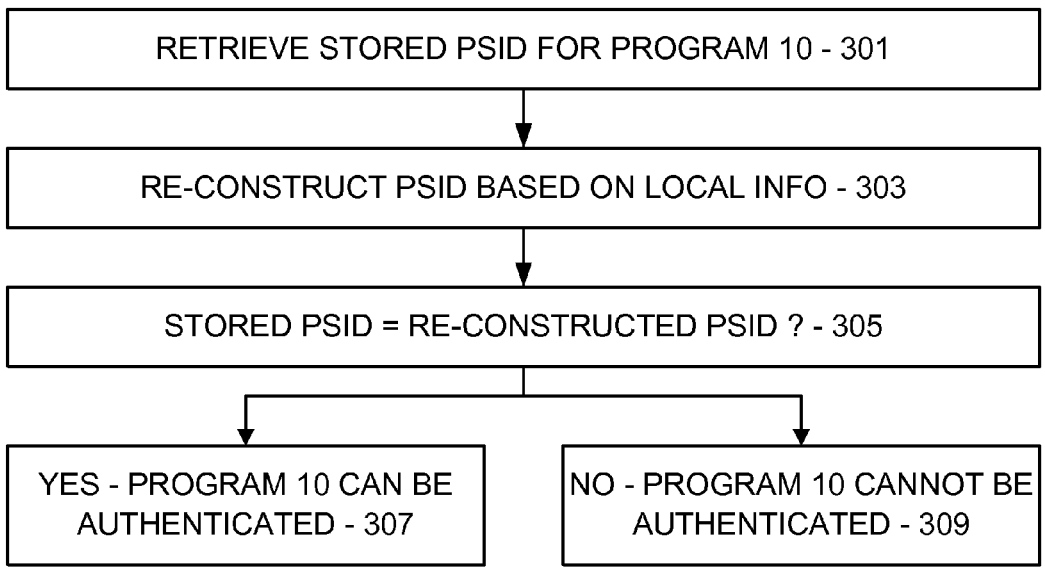
FIG. 3 is a flow diagram showing key steps performed in authenticating the program of FIG. 2 by way of a program security identifier (PSID) thereof in accordance with one embodiment of the present invention.

Significantly, and in one embodiment of the present invention, and turning now to FIG. 3, a program 10 or the hardware 14 authenticates a program 10 at the next layer up (FIG. 2) by retrieving the stored PSID for the program 10 (step 301), by re-constructing the PSID based on the same information as obtained from local sources (step 303), and then by comparing the stored and reconstructed PSIDs to determine whether a match exists (step 305). Presuming a match does indeed exist, it can be concluded that the corresponding program 10 is likely operating in the aforementioned trusted manner according to the aforementioned approved set of conditions as set forth by the publisher or the like, and therefore that the program 10 can be authenticated (step 307). However, if a match does not exist, it can only be concluded that some requirement within the approved set of conditions has not been met and that as a result the program 10 is not operating in a trusted manner, and therefore that the program 10 cannot be authenticated (step 309).

Notably, to re-construct the PSID as at step 303, it is necessary that the stored PSID be accompanied by a set of instructions on how to re-construct same. Such instructions should of course include an identification of each piece of information that is to be locally obtained, the local source for such information, and the like. In addition, such instructions should include how to format the information and how to concatenate and hash same as may be necessary. Note that such instructions may comprise a series of steps to be performed by the program 10 or hardware 14 performing the authentication, or may comprise an executable or the like that itself performs such series of steps.

While a first program 10 at a layer n may be authenticated by a second program 10 at a next layer (n−1) down to a resource 12, there is nothing to establish to the resource 14 that the second program 10 can itself be trusted. Accordingly, the second program 10 should be authenticated by a third program 10 at a next layer (n−2) down to the resource 12, and so on until the program 10 at the bottom-most layer 1 is authenticated by the trusted hardware 14 to the resource 12. More simply, and in one embodiment of the present invention, to represent the overall security environment of a program 10 at issue to a resource 12, a composite of all PSIDs from the program 10 at issue to the program 10 at the bottom-most layer is constructed as a composite PSID (CPSID):

$$CPSID = PSID1, PSID2, \ldots, PSIDn$$

whereby the CPSID may be presented to the resource 12 for example as part of a request to such resource 12 and as an authentication of the program 10 at issue. Typically, inasmuch as the hardware 14 is trusted by the resource 14, the presenter of the CPSID is such hardware 14.

However, if a program 10 at an intermediate layer is trusted by the resource 14, the trusted intermediate program may instead be the presenter without departing from the spirit and scope of the present invention. In such case, the CPSID would be a composite of all PSIDs from the program 10 at issue to the program 10 at the layer x above the trusted intermediate program 10:

$$CPSID = PSIDx, PSID(x+1), \ldots, PSIDn$$

As before, the actual form of the CPSID may indeed be any appropriate form without departing from the spirit and scope of the present invention as long as such stored PSID indeed memorializes an amalgam of all of the individual PSIDs therein in a reproducible manner. For example, the CPSID may be a concatenation of an ordered list of all of the PSIDs therein, or may be a hash of such a concatenation, or may be the result of a mathematical progression based on such PSIDs.

Figure 4:
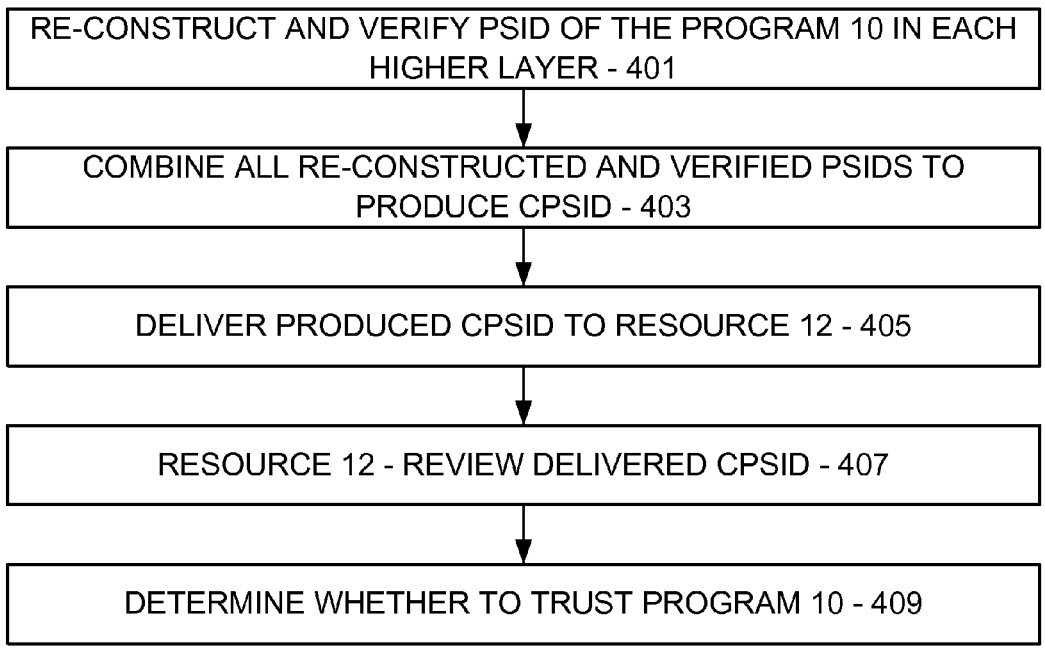
FIG. 4 is a flow diagram showing key steps performed in authenticating the program of FIG. 2 by way of a composite program security identifier (CPSID) thereof in accordance with one embodiment of the present invention.

Significantly, and in one embodiment of the present invention, and turning now to FIG. 4, a program 10 or the hardware 14 authenticating a program 10 at issue one or more layers up (FIG. 2) to a resource 14 would have the PSID of the program 10 in each higher layer re-constructed and verified in the manner of that set forth in connection with FIG. 3 (step 401). Note here that the authenticator 10/14 could either perform such re-construction and verification itself or could have such re-construction and verification for each program 10 performed by the program 10 at the next-lower layer and then have such re-constructed and verified PSID delivered to such authenticator 10/14. In either case, the authenticator 10/14 combines all of the re-constructed and verified PSIDs in an appropriate manner to produce the CPSID (step 403), and then delivers the produced CPSID to the resource 12 (step 405). Presumably, such resource 12 reviews such delivered CPSID (step 407) and determines based at least partially on such review whether to trust the program 10 at issue 409).

Notably, for the CPSID to be comprehended by the resource 12, the resource 12 and the authenticator 10/14 either agree beforehand on how to construct such CPSID, or that the resource provide the authenticator 10/14 with a set of instructions on how to construct such CPSID. Such instructions should of course include an identification of each constituent PSID expected within the CPSID and how to format the PSIDs, including how to concatenate, hash, and/or calculate same as may be necessary. As before, such instructions may comprise a series of steps to be performed by the authenticator 10/14, or may comprise an executable or the like that itself performs such series of steps.

In one embodiment of the present invention, and presuming that the resource 12 imparts trust to the hardware 14 of the computing device 16, such trust is based at least in part on the hardware 14 including a trust module 18 (FIG. 2) that at a minimum authenticates and assigns a PSID to the program 10 at the first layer. Such a trust module 18 is known or should be apparent to the relevant public and therefore need not be set forth herein in any detail. Accordingly, any appropriate trust module 18 may be employed without departing from the spirit and scope of the present invention.

Typically, the trust module 18 operates to provide an architecturally defined execution setting in which the program 10 at the first layer can initialize itself, where such setting is guaranteed free from external perturbation. Also typically, the trust module 18 is provided with a PSID register 20 within which such trust module 18 may store the PSID for the program 10 at the first layer.

It is to be appreciated that in at least some situations, a resource 12 may be willing to accept a CPSID for a program 10 as proffered by the trusted hardware 14 and the trust module 18 thereof and not by any program 10. While the aforementioned PSID register 20 may be employed to store such a CPSID, it is to be appreciated that changes to such PSID register 20 should not normally be made, especially in view of the trust imparted to the hardware 14. Accordingly, to effectuate such a proffer by the trust module 18, and in one embodiment of the present invention, such trust module 18 is also provided with a CPSID register 22 within which such trust module 18 may store a CPSID corresponding to a particular program 10 at any layer. In addition, and importantly, the trust module 18 may employ such CPSID register 22 in the course of calculating or otherwise constructing such CPSID.

Note that if the CPSID is merely a concatenation of a plurality of PSIDs, the CPSID can have a varying length, and can in fact be quite large. However, it is to be appreciated that the hardware 14 and the trust module 18 thereon do not by their nature include very much in the way of space for the CPSID register 22, and accordingly such CPSID register 22 should be kept to a relatively small size. To accommodate any CPSID then, and in one embodiment of the present invention, the trust module 18 mathematically builds up the CPSID in an iterative manner based on each constituent PSID thereof, whereby the length of the CPSID as built up is short enough to fit within the CPSID register 22. In fact, in one embodiment of the present invention, the aforementioned iterative manner includes application of a function that among other things sizes the CPSID to the CPSID register 22.

Note that with the CPSID register 22, the trust module 18 may at times allow the authenticated program 10 at the bottom-most level access to such CPSID register 22, and also allow such authenticated program 10 to construct the CPSID. While doing so presents a security risk, the risk is in fact slight presuming proper safeguard are taken to limit the access of the authenticated program 10 to such CPSID register 22 only. At any rate, the risk is not as severe as if the trust module 18 allowed the authenticated program 10 access to the PSID register 20, and the trust module 18 did directly impart trust to the authenticated program 10.

Figure 5:
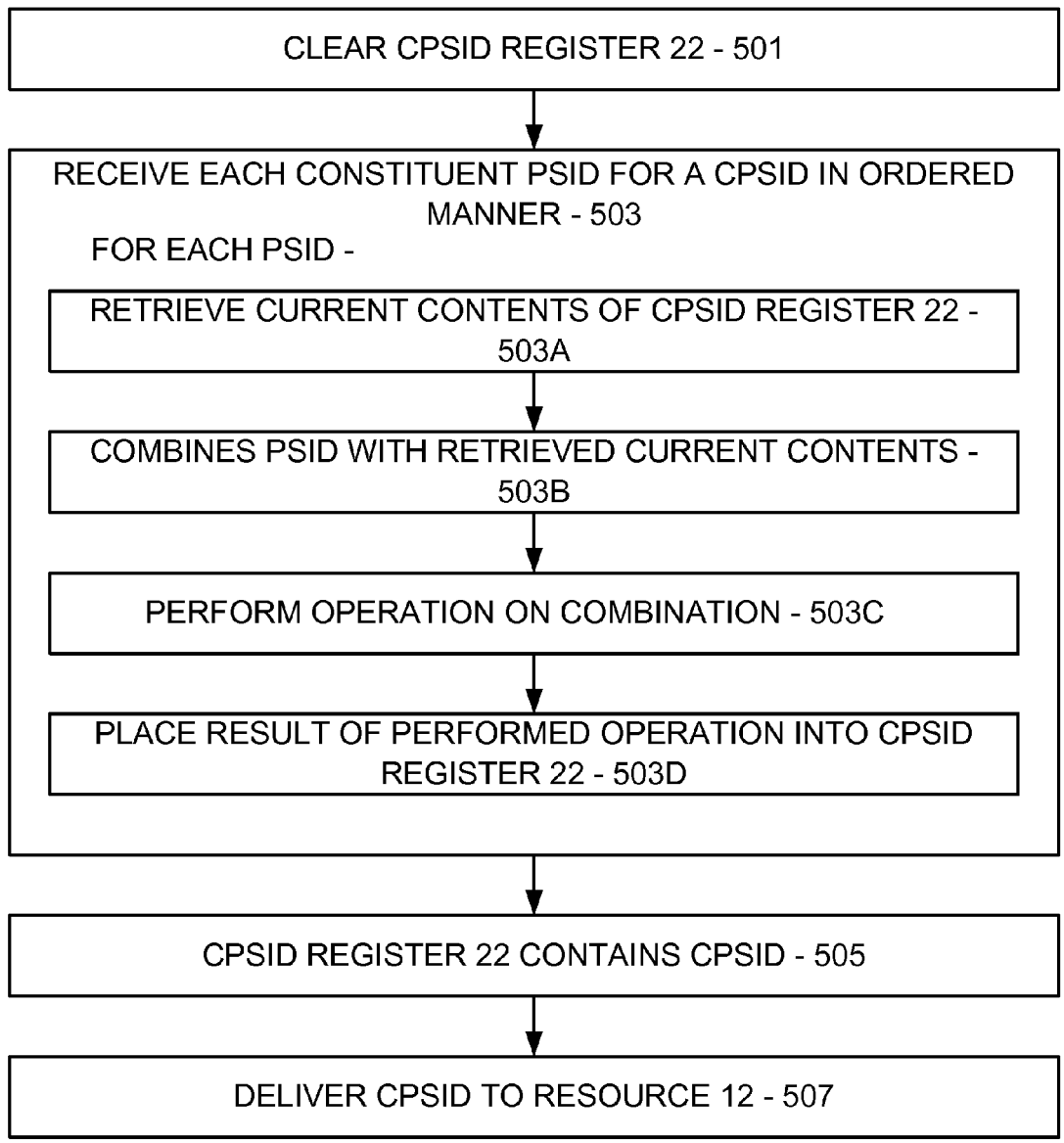
FIG. 5 is a flow diagram showing key steps performed in calculating the CPSID of FIG. 4 based on all of the PSIDs in accordance with one embodiment of the present invention.

To build the CPSID within the CPSID register 22, and in one embodiment of the present invention, and turning now to FIG. 5, the trust module 18 or authenticated program 10 first clears the CPSID register 22 (step 501) and then receives each constituent PSID for a CPSID in an ordered manner (step 503). With such received PSI D, the trust module 18 or authenticated program 10 applies same to a function f that retrieves the current contents of the CPSID register 22 (step 503a), combines the PSID with the retrieved current contents of the CPSID register 22 in some manner (step 503b), performs some sort of mathematical operation on the combination (step 503c), and places the result of the operation into the CPSID register 22 (step 503d). Thus, upon processing the last PSID, the contents of the CPSID register 22 contain the CPSID, which in this instance is based on all of the constituent PSIDs thereof but likely cannot be broken down into such constituent PSIDs (step 505). Nevertheless, such a CPSID can be employed as a valid form to be delivered to a resource 12 as at step 405 of FIG. 4 (step 507).

As may be appreciated, most any combinatorial form may be employed as at step 503b without departing from the spirit and scope of the present invention. For example, a simple concatenation may be employed. Note that inasmuch as such a concatenation may not fit within the CPSID register 22, such concatenation may be stored in an alternate location. As may also be appreciated, most any mathematical operation may be employed as at step 503c For example, the mathematical operation may comprise a hash function such as a SHA hash function, and the hash function may further be selected so as to produce a fixed-length output of convenient size to fit in the CPSID register 22 as at step 503d.

CONCLUSION

The present invention may be practiced with regard to any appropriate computing device 16 with layered programs 10, where each of several programs 10 is to be authenticated to a local or remote resource 12. As should now be appreciated, with the present invention as set forth herein, the authentication is based not only on the program 10 itself but on the setting and inputs to the program 10 and the underlying platform upon which the program 10 operates. Such settings and inputs and the program 10 itself may be represented as a PSID, and such underlying platform may be represented as a CPSID constituting a composite of all of the PSIDs of such programs 10.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method and mechanism by which a computer program 10 can be authenticated both in terms of the program 10 itself and the underlying platform upon which the program 10 operates. The authentication of the program 10 itself includes a consideration of the setting within which the program 10 runs and the inputs that are provided to the program 10. The authentication of the program 10 includes an authentication of the underlying platform upon which the program 10 operates.

It should be appreciated that changes could be made to the embodiments described above without departing from the inventive concepts thereof. In general then, it should be understood, therefore, that this invention is not limited to the particular embodiments disclosed, but it is intended to cover modifications within the spirit and scope of the present invention as defined by the appended claims.

The invention claimed is:

1. A method in combination with a program operating on a computer, the method for authenticating the program to a resource on the computer and comprising:

retrieving, by the resource on the computer, a stored program security identifier (PSID) corresponding to the program, the stored PSID comprising information based on the program itself, an execution setting of the program, a first list of other programs that should not be operating on the computer, and any inputs and initializations that are provided to the program, whereby the stored PSID represents an approved set of conditions for operating the program in a trusted manner;

retrieving, by the resource on the computer, a set of instructions for constructing a second PSID, the set of instructions comprising an identifier of a first program that should not be operating on the computer;

determining, by the resource on the computer based at least in part on the identifier of the first program, that the first program is not operating on the computer from a local source;

constructing, by the resource on the computer, the second PSID according to the set of instructions, the second PSID comprising a second list of programs that should not be operating on the computer, the second list of programs that should not be operating on the computer comprising the identifier of the first program;

comparing, by the resource on the computer, the stored PSID and the second PSID to determine whether the stored PSID matches the second PSID;

if the stored PSID matches the second PSID, the resource on the computer concluding that the program operates in the trusted manner according to the approved set of conditions; and if the stored PSID does not match the second PSID, the resource on the computer concluding that the program does not operate in the trusted manner according to the approved set of conditions.

2. The method of claim 1 wherein the program to be authenticated is hosted by a number of layers of other programs that ultimately rest upon hardware representative of the computer.

3. The method of claim 1 wherein the program to be authenticated is hosted by a number of layers of other programs that ultimately rest upon hardware representative of the computer, the method being performed by a program hosting the program to be authenticated and at a next layer toward the hardware.

4. The method of claim 1 comprising retrieving the stored PSID comprising information based on the program itself, such information including at least one of a digital certificate corresponding to the program and a manifold corresponding to the program.

5. The method of claim 1 comprising retrieving the stored PSID comprising information based on the execution setting of the program, such information including at least one of an identification of other programs directly or indirectly hosting the program to be authenticated, and other programs that should be operating on the computer.

6. The method of claim 1 comprising retrieving the stored PSID comprising information based on the inputs to the program, such information including at least one of an approved set of inputs for the program.

7. The method of claim 1 comprising retrieving the stored PSID comprising the information set forth as one of a list and a hash.

8. The method of claim 1 wherein the set of instructions further comprises a series of steps to be performed and an executable that performs such series of steps.

9. A method in combination with a program operating on a computer, the method for authenticating the program to a first resource on the computer, the program to be authenticated being hosted by a number of layers of hosting programs that ultimately rest upon hardware representative of the computer, the method comprising:

for each of the programs to be authenticated and the hosting program at each of some layers, establishing by a second resource on the computer a program security identifier (PSID) corresponding to the program, the established PSID including information based on the program itself, an execution setting of the program, a first list of other programs that should not be operating on the computer, and any inputs and initializations that are provided to the program, whereby the PSID represents an approved set of conditions for operating the program in a trusted manner;

combining by the second resource on the computer all of the established PSIDs to produce a composite PSID (CPSID) representing an overall security environment of the program to be authenticated;

delivering the produced CPSID from the second resource to the first resource, whereby the first resource reviews such delivered CPSID and determines based at least partially on such review whether to trust the program to be authenticated; and delivering a set of instructions for constructing a second CPSID from the second resource to the first resource, wherein the set of instructions comprise an identification of each of the established PSIDs and a second set of instructions for constructing comparison PSIDs.

10. The method of claim 9 comprising establishing the PSID for a particular program by a hosting program at a next layer from the particular program toward the hardware.

11. The method of claim 9 wherein establishing the PSID for a particular program includes retrieving a stored PSID corresponding to the program, re-constructing the retrieved PSID based on the same information as obtained from local sources, and comparing the stored and reconstructed PSIDs to determine that a match exists.

12. The method of claim 11 comprising:

for each of the programs to be authenticated and the hosting program at each layer, establishing by the second resource on the computer a program security identifier (PSID) corresponding to the program, the stored PSID including information based on the program itself, an execution setting of the program, a second list of other programs that should not be operating on the computer, and any inputs and initializations that are provided to the program, whereby the stored PSID represents an approved set of conditions for operating the program in a trusted manner; and combining by the second resource on the computer all of the established PSIDs to produce the CPSID representing an overall security environment of the program to be authenticated.

13. The method of claim 9 comprising combining all of the established PSIDs to produce a CPSID as one of an ordered list of the established PSIDs, a hash of the established PSIDs, and the result of a mathematical progression based on the established PSIDs.

14. The method of claim 9 comprising establishing the PSID for each program to include information based on the program itself, such information including at least one of a digital certificate corresponding to the program and a manifold corresponding to the program.

15. The method of claim 9 comprising establishing the PSID for each program to include information based on the execution setting of the program, such information including at least one of an identification of other programs directly or indirectly hosting the program to be authenticated, and other programs that should be operating on the computer.

16. The method of claim 9 comprising establishing the PSID for each program to include information based on the inputs to the program, such information including at least one of an approved set of inputs for the program.

17. The method of claim 9 wherein the hardware includes a trust module combining all of the established PSIDs to produce the CPSID and delivering the produced CPSID to the second resource.

18. The method of claim 9 wherein combining all of the established PSIDs to produce the CPSID comprises:
   clearing a memory location designated to hold the CPSID;
   receiving each established PSID for the CPSID in an ordered manner and, for each received PSID and in an iterative manner:
   applying the received PSID to a function f that retrieves a current contents of the memory location;
   combining the received PSID with the retrieved current contents of the memory location in a predetermined manner;
   performing a mathematical operation on the combination to produce a result; and
   placing the result of the operation into the memory location, such that upon processing all PSIDs the memory location contains the CPSID.

19. The method of claim 18 comprising combining the received PSID with the retrieved current contents of the memory location by concatenation.

20. The method of claim 18 comprising performing a hash function on the combination to produce the result.

* * * * *